(12) United States Patent
Urbach

(10) Patent No.: US 10,817,051 B2
(45) Date of Patent: Oct. 27, 2020

(54) ELECTRONIC CONTACT LENSES AND AN IMAGE SYSTEM COMPRISING THE SAME

(71) Applicant: Julian Michael Urbach, Los Angeles, CA (US)

(72) Inventor: Julian Michael Urbach, Los Angeles, CA (US)

(*) Notice: Subject to any disclaimer, the term of this patent is extended or adjusted under 35 U.S.C. 154(b) by 42 days.

(21) Appl. No.: 14/208,886

(22) Filed: Mar. 13, 2014

(65) Prior Publication Data

US 2015/0261294 A1   Sep. 17, 2015

(51) Int. Cl.
| | |
|---|---|
| *G06F 3/01* | (2006.01) |
| *G06F 1/16* | (2006.01) |
| *G06F 3/0481* | (2013.01) |
| *G02C 7/04* | (2006.01) |
| *G02C 7/10* | (2006.01) |

(52) U.S. Cl.
CPC ............ *G06F 3/013* (2013.01); *G02C 7/04* (2013.01); *G02C 7/101* (2013.01); *G06F 1/1686* (2013.01); *G06F 1/1694* (2013.01); *G06F 3/015* (2013.01); *G06F 3/04815* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,393,266 A | * | 1/1946 | Riddell ..................... | G02C 7/04 351/159.37 |
| 5,682,210 A | | 10/1997 | Weirich | |
| 6,570,386 B2 | * | 5/2003 | Goldstein ............... | H02J 17/00 324/415 |
| 8,118,752 B2 | * | 2/2012 | Hetling ................. | A61B 5/0496 600/372 |
| 9,111,473 B1 | * | 8/2015 | Ho .......................... | G09G 5/00 |
| 2003/0021601 A1 | * | 1/2003 | Goldstein .............. | G03B 17/00 396/263 |

(Continued)

FOREIGN PATENT DOCUMENTS

| | | |
|---|---|---|
| KR | 10-2013-0008902 | 1/2013 |
| WO | WO 2012151538 | 11/2012 |

OTHER PUBLICATIONS

International Search Report (PCT/US2015/020350) dated Jun. 5, 2015; 3 pages.

(Continued)

*Primary Examiner* — William Boddie
*Assistant Examiner* — Alecia D English
(74) *Attorney, Agent, or Firm* — James J. DeCarlo; Greenberg Traurig, LLP

(57) ABSTRACT

A powered contact lens is configured to receive rendered images and provide the rendered images to a user on a display screen built into it. The powered contact lens is also configured so that the position of the wearer's eyes can be precisely tracked and the images can be rendered at a likely resting position. A power source located on the contact lens powers the display screen and the communication module. The communication module receives the rendered images from a disparate image rendering device. An image system comprises the image rendering device, a pair of powered contact lenses which are configured to received and provide the rendered images to a user.

31 Claims, 11 Drawing Sheets

(56) References Cited

U.S. PATENT DOCUMENTS

| | | | | |
|---|---|---|---|---|
| 2005/0119544 A1* | 6/2005 | Valjakka | A61B 5/0496 600/372 |
| 2008/0266257 A1 | 10/2008 | Chiang | | |
| 2009/0189830 A1* | 7/2009 | Deering | G09G 3/02 345/1.3 |
| 2009/0204207 A1 | 8/2009 | Blum et al. | | |
| 2010/0001926 A1* | 1/2010 | Amirparviz | A61B 5/1455 345/7 |
| 2012/0092612 A1* | 4/2012 | Binder | A61F 2/1613 351/159.02 |
| 2012/0109296 A1* | 5/2012 | Fan | A61F 2/14 623/6.63 |
| 2012/0154277 A1* | 6/2012 | Bar-Zeev | G02B 27/017 345/158 |
| 2012/0199995 A1* | 8/2012 | Pugh | A61N 5/0618 264/1.36 |
| 2013/0176533 A1* | 7/2013 | Raffle | A61B 3/113 351/209 |
| 2014/0022505 A1 | 1/2014 | Pugh et al. | | |
| 2014/0036224 A1 | 2/2014 | Spaulding et al. | | |
| 2014/0194708 A1* | 7/2014 | Ho | A61B 5/0004 600/318 |
| 2014/0240655 A1* | 8/2014 | Pugh | G02C 7/04 351/158 |
| 2014/0300532 A1* | 10/2014 | Karkkainen | G06F 3/015 345/156 |
| 2015/0248793 A1* | 9/2015 | Abovitz | G06K 9/00671 345/633 |

OTHER PUBLICATIONS

"Contact lenses with circuits, lights a possible platform for superhuman vision": Jan. 17, 2008; 2 pages http://www.eurekalert.org/pub_releases/2008-01/uow-clw011708.php.

Hodgin, R. "Personal contact lens displays: The transparent OLED done one better"; May 14, 2009; 5 pages, http://www.geek.com/chips/personal-contact-lens-heads-up-display-designs-do-transparent-oled-one-better-20090514/.

Karten, S, "Will Smart Contact Lenses be the Bluetooth Headsets of the Future?"; Apr. 21, 2010; 5 pages, https://www.fastcompany.com/1623012/will-smart-contact-lenses-be-bluetooth-headsets-future.

* cited by examiner

ELECTRONIC CONTACT LENSES AND AN IMAGE SYSTEM COMPRISING THE SAME

CROSS REFERENCES TO RELATED APPLICATIONS

The present application claims priority to U.S. non-provisional patent application Ser. No. 13/829,918, entitled "Eye Piece for Augmented and Virtual Reality" filed on Mar. 14, 2013, U.S. non-provisional patent application Ser. No. 13/830,190, entitled "Tactile Elements for a Wearable Eyepiece" filed on Mar. 14, 2013, and U.S. non-provisional patent application Ser. No. 13/830,370, entitled "Visual Cortex Thought Detector Interface" filed on Mar. 14, 2013, the entireties of these applications is incorporated herein by reference.

The present disclosure relates to systems and methods related to a wearable imaging systems that comprises electrically powered contact lenses.

BACKGROUND

The rapid evolution in the field of electronics and computing devices has resulted in the emergence of wearable electronic and computing systems. Such systems are configured to be attached to human bodies and execute various tasks that may include providing information or entertainment to the wearer or monitoring the wearer's body signals. For example, spectacles that are communicatively coupled to remote servers and with lenses that act as display screens providing data overlays for real-world objects are commercially available. Another example of wearable devices includes contact lenses including electronic circuitry for automatically adjusting the focus of the contact lenses.

SUMMARY

This disclosure is related to systems and methods for using electrically powered contact lenses that can receive and display images to users. In an embodiment a powered contact lens is disclosed. The powered contact lens comprises a power source, a wireless communication module, a display screen and a tracking element. In an embodiment, the tracking element further comprises a plurality of markings and one or more light sources arranged on a periphery of the contact lens. In an embodiment, the light sources are LEDs arranged equidistant from each other. The plurality of markings may comprise a first subset of markings that extend from a first edge of the contact lens to a second edge of the contact lens and a second subset of markings that are normal to the first set of markings encircling the curvature of the contact lens. The plurality of markings facilitate tracking in 3-dimensional space, a position of an eyeball on which the contact lens is placed. In an embodiment, the plurality of markings are grooves made in the material of the contact lens. In an embodiment, the grooves include a conducting material to distribute power to elements spread around the contact lens. The display screen is located at a central portion of the contact lens while the hardware such as the power source and the wireless communication module is located behind the display screen.

An image system comprising at least one powered contact lens an image renderer communicatively coupled to the at least one powered contact lens is disclosed in one embodiment. The contact lens comprises at least a display screen, a power source and a tracking element. In an embodiment, the image renderer is a computing device that comprises a camera for tracking a linear and angular position of the eyes of a user wearing the powered contact lenses. The image renderer comprises a communication interface for transmitting rendered images to and for receiving tracking data from each of the two powered contact lenses. Tracking logic is executed by a processor comprised within the image renderer, for determining changes in linear and angular positions of a user's eye that wears the powered contact lens. The image renderer further comprises analyzing logic, executed by the processor, for estimating the final position at which the wearer's eyes are likely to come to rest. A rendering module is also executed by the processor comprised within the image renderer for rendering a viewpoint in a 3D virtual space at the likely final position. In an embodiment, the image system comprises a thought detector for detecting electrical signals from the wearer's brain. The thought detector comprises a wearable portion configured to be attached to a wearer's head. The wearable portion comprises electrodes that are configured to detect electrical signals from the wearer's visual cortex.

A method of providing content is disclosed in an embodiment, The method is executable by a processor and comprises the steps of rendering an initial image, transmitting the rendered initial image to at least one powered contact lens inserted into a user's eye such that the rendered initial image is displayed on a display screen comprised in the powered contact lens, tracking motion of the user's eye wearing the powered contact lens, estimating a final position at which the user's eye wearing the contact lens is likely to rest based at least on the tracking A second image that shows a viewpoint associated with the final position is rendered and transmitted to the powered contact lens for display to the user.

In an embodiment, tracking the motion of the user's eye further comprises receiving a continuous image stream of the user's eye, mapping the position of the user's eye in the image stream relative to the 3-dimensional space based on a plurality of markings included on the powered contact lens. Changes in linear and angular positions of the user's eye are thus determined via the mapping. In an embodiment, estimating the final position further comprises determining an amplitude and direction of the motion of the user's eye. An embodiment of the method further comprises receiving input from the user's visual cortex, by the processor and estimating the final position based additionally on the input received from the user's visual cortex.

A processor executable method of providing content is disclosed in an embodiment. The method comprises rendering an initial image and transmitting the rendered initial image to a powered contact lens inserted into a user's eye such that the rendered initial image is displayed on a display screen comprised in the powered contact lens. The processor receives input from the user's visual cortex and the rendered initial image is altered based on the input from the user's visual cortex. The altered image is again rendered and transmitted to the powered contact lens for display on the respective display screens.

In an embodiment, receiving input from the visual cortex further comprises, receiving, by the electrical signals sensed from the user's visual cortex and identifying a command from the received electrical signals. The rendered initial image is altered based on the command. In an embodiment the image comprises text data and the command alters the text data.

A non-transitory computer readable medium comprising instructions is disclosed in one embodiment. The instructions when executed by a processor, cause the processor to render an initial image and transmit the rendered initial image to at least one powered contact lens inserted into a user's eye such that the rendered initial image is displayed on a display screen comprised in the powered contact lens. The instructions also cause the processor to track motion of the user's eye wearing the powered contact lens, estimate a final position at which each of the user's eye wearing the contact lens is likely to rest based at least on the tracking so that a second image that shows a viewpoint associated with the final position is rendered and transmitted to the powered contact lens for display to the user.

In an embodiment, the instructions for tracking the motion of the user's eye further comprise instructions that cause the processor to receive a continuous image stream of the users eye, map the positions of the user's eye in the 3D space based on positions of a plurality of markings included on the powered contact lens in the image stream. This facilitates the processor to determine changes in linear and angular positions of the user's eye via the mapping. In an embodiment, instructions for estimating the final position further comprise instructions that cause the processor to determine an amplitude and direction of the motion of the user's eye.

In one embodiment, the computer readable medium further comprises instructions that cause the processor to receive input from the user's visual cortex. The instructions for estimating the final position further comprising instructions that cause the processor to estimate the final position based additionally on the input received from the user's visual cortex.

A non-transitory computer readable medium comprising instructions is disclosed in one embodiment. The instructions cause the processor to render an initial image and transmit the rendered initial image to at least one powered contact lens inserted into a human user's eye such that the rendered initial image is displayed on a display screen comprised in the powered contact lens. The computer readable medium further comprises instructions for the processor to receive input from the user's visual cortex, alter the rendered initial image based on the input from the user's visual cortex, render the altered image and transmit the altered image to the powered contact lens for display on the respective display screens.

In one embodiment instructions for receiving input from the visual cortex further comprise instructions that cause the processor to receive electrical signals sensed from the user's visual cortex and identify a command from the received electrical signals. In one embodiment, instructions for altering the rendered initial image based on the input further comprise instructions that cause the processor to alter the rendered initial image based on the command.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
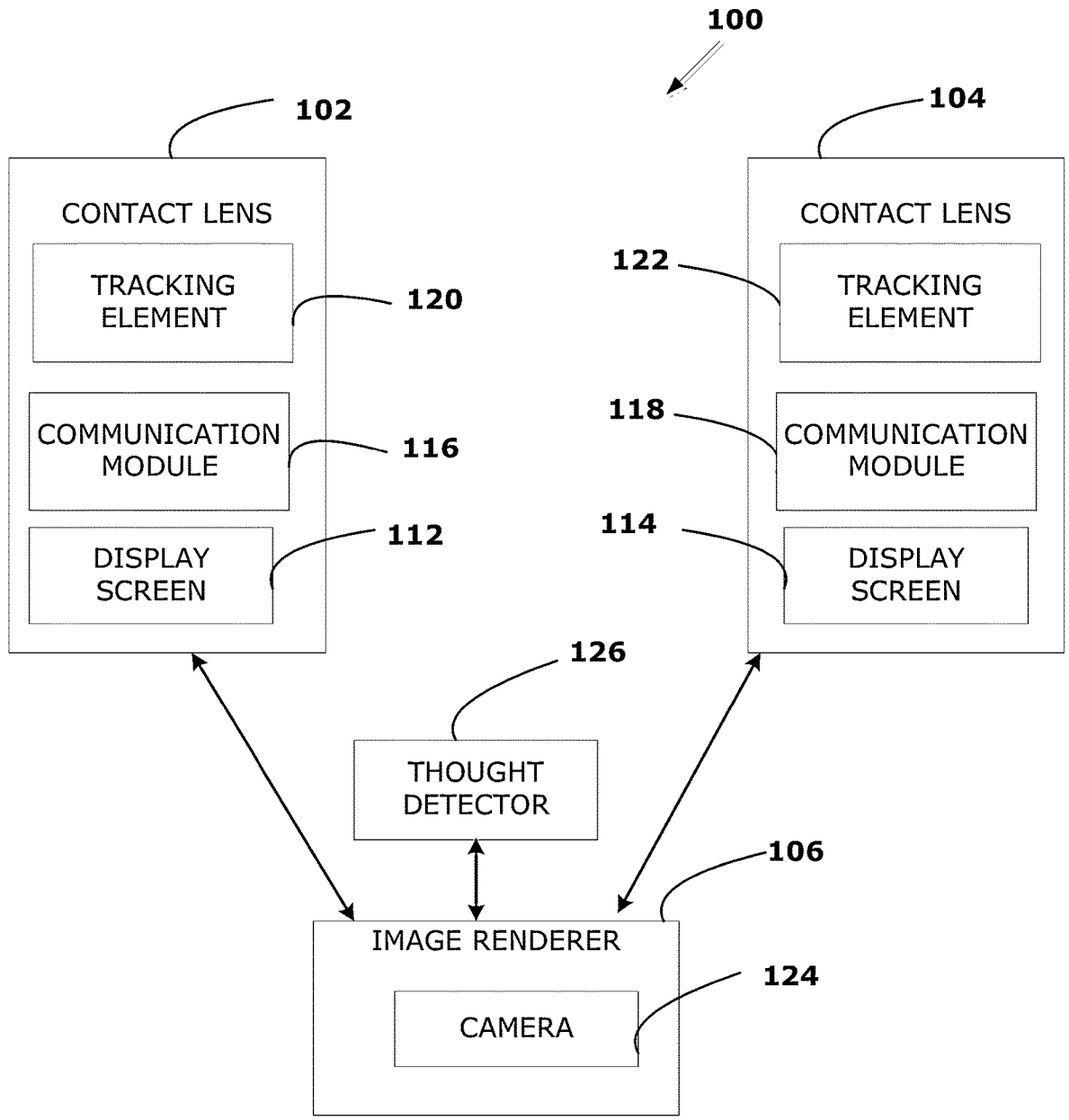
FIG. 1 shows an image generating and transmitting system comprising electronic or electrically powered contact lenses disclosed in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Contact lenses are generally thin lenses worn directly on the eye for therapeutic purposes such as correcting visual defects and for cosmetic reasons such as for changing the eye color. The contact lenses are generally made from oxygen permeable materials. Soft contact lenses that are widely used are made from Silicon hydrogel and may have a circumferential radius of between 7 mm to about 9 mm. As a result contact lenses with lower circumferential radii cover only the cornea whereas contact lenses, known as scleral lenses, with larger circumferential radii not only cover the cornea but also cover the white of the eye (the sclera). With the increasing miniaturization of various electronic components, powered contact lenses are being developed that include electronic components. As the electronic components included in such contact lenses are tiny, their power requirements are also very low. Accordingly, contact lenses that can be powered from various sources such as the blinking of the wearer or from the solar power are being developed.

FIG. 1 shows an image generating and transmitting system 100 comprising electronic contact lenses is disclosed in accordance with one embodiment. In an embodiment, the image system 100 comprises two contact lenses 102, 104 that are communicatively coupled to an external image renderer 106. Any computing device that includes one or more of a multipurpose processor or graphics processor that stores and executes the programming logic for executing various tasks as detailed herein can be used as the image renderer 106. For example, electronic devices such as desktops, televisions or mobile devices such as laptops, smartphones, tablet devices or any wearable computing device can be used as the image renderer 106. The image renderer 106 can be configured to render images and transmit the rendered images for display to a user wearing the contact lenses 102, 104.

It can be appreciated that a respective image for each of the two display screens 112 and 114 can be rendered by the image renderer 106. In an embodiment, first and second portions of a contiguous image can be rendered for presentation to the wearer on a respective display screen 112 and 114. This arrangement of images increases the area available for image display and facilitates accommodating the stereoscopic vision of the wearer's eyes. In an embodiment, the contact lens 102 is identical to the contact lens 104 an may be worn interchangeably. In an embodiment, the various electronic components that form part of the image system 100 can be asymmetrically divided between the contact lenses 102 and 104 so that the wearer is directed to insert a particular lens in a particular eye. In the embodiment wherein the contact lenses 102 is identical to the contact lens 104, each of the contact lenses 102, 104 comprises a communication module 116, 118 such as a Bluetooth transceiver which enables the contact lenses 102, 104 to receive the rendered image from the image renderer 106. A display screen 112, 114 also included in each of the contact lenses 102, 104 displays the received image to a user wearing the contact lenses 102, 04. As the rendered image is directly transmitted into the user's eyes, the extent to which the scene or image should be rendered is vastly reduced. For example, when rendering scenes or images for conventional display devices such as televisions, computing devices or mobile devices, the entire scene or image needs to be rendered as the screen on which the rendered image is displayed is at located a particular distance to the user's eye. In the case of the image system 100, the entire scene need not be rendered. Rather, only the portion of the scene in the user's view needs to be rendered as the display screens 112, 114 are located in the user's eyes. As a result, electronic devices with lower processing power, such as smartphones, can also be used to render high quality images and videos. It may be appreciated that the content presented in accordance with embodiments described herein can include static content such as photos, text or other data and dynamic content such as movies, videos, games, interactive presentations and the like.

In an embodiment, each of the contact lenses 102, 104 has a respective tracking element 120, 122. The tracking elements 120 and 122 enable the image system 100 to track the wearer's eyes when they are open. This can be used to guide the image being projected onto the respective display screens 112 and 114. In an embodiment, each of the tracking elements 120, 122 comprise one or more of minute light sources such as LEDs (light emitting diodes) and in embodiments can be arranged or configured in a detailed, predetermined pattern (not shown in FIG. 1). The light sources serve to illuminate the wearer's eyes so that a camera 124 comprised within the image renderer 106 can track them. The detailed pattern enables the camera 124 in determining the precise linear and angular position of the wearer's eyes in the three dimensional space. Alternatively, various components in the lens itself could detect change in the eye movement such as via accelerometer or a gyroscope (not shown in FIG. 1).

In an embodiment, the image system 100 further comprises a thought detector 126 that detects thoughts of the wearer and changes the display on the screen(s) 112, 114 based on such detected thoughts. In an embodiment, the thought detector 126 can comprise different elements that include a wearable portion (not shown) that is communicatively coupled via one or more of wireless or wired connection to a computing device. The wearable portion is in physical contact with different points of the wearer's head. In an embodiment, the wearable portion can include a headset with sensors to be attached to different points of the wearer's head. In an embodiment, the wearable portion can be attached to the wearer's head via attaching mechanism such as but not limited to a band.

In an embodiment, the computing device coupled to the wearable portion can be the image renderer 106. Thus, a processor included in the image renderer 106 can execute the programming logic required to process signals from the wearable portion of the thought detector 126 and manipulate the content presented on the contact lenses 102, 104 to the wearer in accordance with the received signals. Hence, in an embodiment, the thought detector 126 can comprise a combination of hardware which includes the wearable portion and the computing device as well as software required to process the signals from the wearable portion to generate an appropriate output.

In an embodiment, the programming logic for executing the tasks of the thought detector 126 can be executed by a computing device disparate from the image renderer 106. In this case, the contact lenses 102, 104 can be communicatively coupled to the thought detector 126 via the image renderer 106. In an embodiment, the thought detector 126 comprises components that record the electrical activity of the brain via leads that contact the rear portion of the head where the virtual cortex of the brain is situated. Technologies such as EEG (electroencephalograph), are known which provide ways of non-invasively observing human brain activity. Known software interfaces can be adapted for use with the image system 100 to record thoughts and manipulate content as will be detailed further herein.

In an embodiment, wherein the tracking elements 120 and 122 are communicatively coupled to the camera 124 and the thought detector 126, a processor (not shown) associated with the image renderer 106 can estimate the likely resting position of the wearer's eyes. Research shows that there are six muscles (extraocular muscles) attached to a human eye. The extraocular muscles enable the human eye to move up, down, side-to-side and to rotate. As the linear and angular position of the wearer's eyes is precisely tracked based on the tracking elements 120, 122, the direction of motion of the wearer's eyes can be perceived by the camera 124. Based on the tracking and the estimated resting position of the wearer's eyes, the image renderer 106 can render images or viewpoints at the likely resting position of the wearer's eyes in advance of the wearer's eyes reaching the likely resting position.

In a further embodiment, the thought detector 126 can maintain a surface connection with the visual cortex of the wearer's brain. When the wearer thinks of moving his/her eyes, the muscles of the visual cortex are activated prior to the actual eye motion. Such activation of the visual cortex can send a signal to the wearer's eyes which is detected by the thought detector 126. In an embodiment, this information can be combined with the tracking data of the wearer's eyes to render viewpoints prior to the wearer's eyes reaching the final resting position. The viewpoints in the image system 100 are therefore rendered with almost zero latency.

In an embodiment, the image system 100 can be configured to amplify signals detected from the wearer's brain by the thought detector 126. The amplified signals can be used as input provided by the wearer to manipulate content. In one embodiment, the wearer can be provided with information on the signals that need to be generated for executing particular tasks in the image system 100 and the specific thoughts or visions that generate such signals. The electrical signals generated in the wearer's brain can be therefore used as control mechanism, for example, to adjust view position/orientation in the image system 100. When such input signals are detected, the thought detector 126 can further process the signals to amplify them and map specific signals to particular types of input and provide such input to the image renderer 106. The image renderer 106 can be configured to execute specific tasks based on the particular input received from the thought detector 126.

As low energy, microscopic movements of the eye are amplified or exaggerated and used as input to the image system 100, the wearer receives an illusion that he/she is moving faster with substantially no motion. The amplified input from the thought detector 126 combined with the rendering of viewpoints at estimated final resting position of the eyes as described supra serve to provide the wearer with an illusion that he/she is moving faster with substantially no physical motion. The rendering process is also thus accelerated to approach zero or near-zero latency. In an embodiment, microscopic movements of other muscles in the head region such as slight movements of the facial muscles, neck or head can also be detected, for example, by the camera 124. The input received from other portions of the wearer's head region can also be used as input to manipulate content in the image system 100.

The image system 100 can additionally facilitate storing user experiences, recreating the user experiences and exchanging user experiences according to one embodiment. In an embodiment, a user experience can comprise a content item with its associated audio and other feedback data such as, for example tactile feedback where applicable. This allows the wearer to consume an item of content via the image system 100, interact with the content item and change the content item to create a new content item which can be stored in one or more of a local storage device or a processor readable storage on the LAN or a remote processor readable storage on the 'cloud' which can constitute one or more remote servers and which stream content to the image system 100. Such new content items or user experiences created by the wearer can be shared with other users. For example, a video game consumed by the wearer can have certain feedback or effects associated with certain portions. If desired, the wearer can change the video game to layer in additional feedback and store the video game with the changed feedback information as a user experience which may further be shared with other users. In an embodiment, the additional feedback can comprise including a particular audio effect, changing the images being displayed or even altering any tactile feedback associated with the content portions being changed. In an embodiment, the stored/shared user experience can comprise additional content that is obtained from external sources. For example, images or voice over obtained from other content can be added to a particular content item. In an embodiment, the new content added to a user experience can be obtained from the wearer's thoughts by the thought detector 126. Such alterations can be accomplished, for example, via user selectable menu items provided by the programming logic of the image system 100.

It may be appreciated that the only a subset of elements of the image system 100 are illustrated in FIG. 1 for brevity and that the image system 100 can comprise other elements and modules as will be detailed further infra. For example, the image system 100 can include audio components such as, speakers/headphones and a microphone that provide audio to and receive voice input from the wearer. In an embodiment, the audio components can be comprised in the image renderer 106. In an embodiment, the image system 100 can also include elements that provide tactile feedback. The tactile elements can be communicatively coupled to the image renderer 106. When attached to a part of the wearer's body, for example, on the wrist, they can be configured to provide tactile feedback in consonance with the play of content by the image renderer 106.

Figure 2:
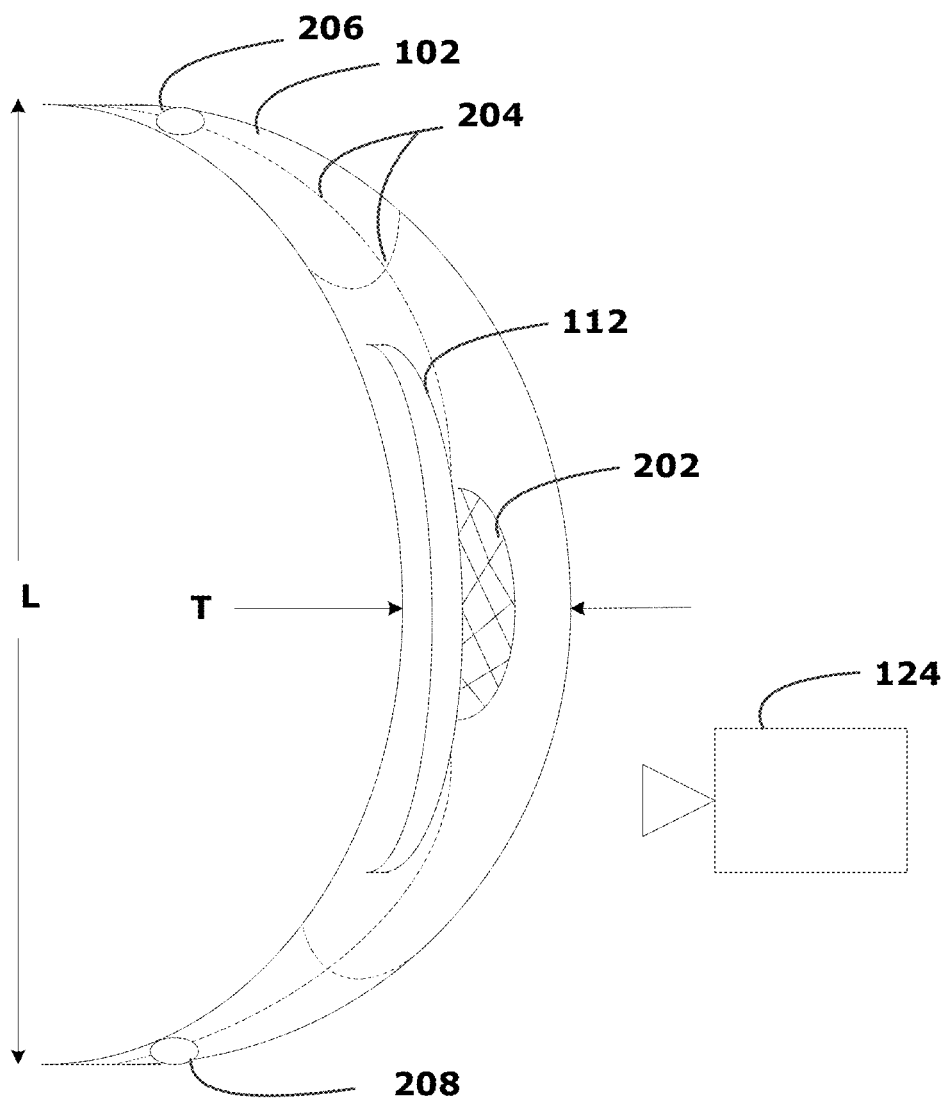
FIG. 2 is a cross section view of one of the contact lenses in accordance with one embodiment.

FIG. 2 is a cross section view of one of the contact lenses 102 in accordance with one embodiment. It may be noted that only the contact lens 102 may be mentioned when discussing the details for the sake of brevity. However, such details are equally applicable to the contact lens 104 unless otherwise specified. Moreover, it may be appreciated that the various details of the contact lenses 102/104 are described herein only by the way of illustration and not limitation and that any contact lenses that are currently know or to be invented can be used in the image system 100 in accordance with embodiments described herein. In an embodiment, the contact lens 102 can be a hard or soft lens that is used commonly for therapeutic or cosmetic purposes. As a result the contact lens 102 may have optical power in one embodiment. In an embodiment the contact lens 102 may not have optical power. In an embodiment the contact lens 102 can be made from plastic hydrogel polymers with varying water content or from more rigid materials combined with other plastic materials to increase oxygen permeability. In an embodiment the size L of the contact lens 102 can vary from 8 mm to about 14.5 mm with a center thickness T of approximately 30 µm-100 µm. Also in an embodiment, a single lens needs to be worn rather than a pair and the functionality may be split or divided or stored between the lenses 102, 104.

In an embodiment, the contact lens 102 comprises a display screen 112 at the central portion of the lens. In an embodiment, the display screen 112 can be an OLED (organic light emitting diode) screen of approximately 25 sq. mm to about 50 sq. mm. so that it occupies approximately 20-50% of the surface area of the contact lens 102 and suitable thickness such that the display screen 112 can be embedded within the material of the contact lens 112. As an OLED display works without backlight, it can be thin, light and a higher contrast ratio can be achieved in low ambient light conditions. Thus, the wearer's eye comes into contact with only the material of the contact lens 102. In addition, the contact lens 102 includes additional hardware 202 to at least receive rendered images from the image renderer and display the received images to the wearer. In order to minimize the circuitry (and hence, the lens thickness) required to operate the electronic components of the contact lens 102, the electronic components are arranged therein in the form of a Bell curve. The circuitry is embedded in the contact lens 102 so that the wearer's eyelid can comfortably blink when the contact lens 102 is inserted into the eye. Thus, the hardware 202 is arranged proximate to the display screen 112 away from the wearer's eye at the central portion of the contact lens 102. The hardware 202 can comprise various electronic elements required for proper functioning of the contact lens 102 as will be detailed further herein.

The contact lens 102 also comprises a detailed pattern etched or embedded therein to enable tracking of the wearer's eye as described supra. In an embodiment the detailed pattern 204 can comprise a plurality of markings embedded into the material of the contact lens 102. In one embodiment, the plurality of markings can comprise a first subset and a second subset of markings that are spread over the entire surface of the contact lens 102. The first subset can include markings that extend from one edge of the lens periphery to an opposite edge. The second subset can include markings that extend around the surface of the lens 102 substantially normal to the first subset. In addition, the contact lens 102 includes tiny light sources 206, 208 arranged at its periphery. In an embodiment, the markings are grooves configured into the material of the contact lens 102. At least some of the grooves may be filled with conducting materials in order to transmit power from the hardware 202 to various parts of the contact lens 102 such as, light sources 206, 208. The light sources 206 illuminate the eye and the detailed pattern such that the camera 124 on the image renderer 106 is able to track the movement of the wearer's eye. In an embodiment, the light sources can be LEDs (light emitting diodes) which emit optimal light to enable tracking the wearer's eyes without hindering the wearer's vision.

Figure 3:
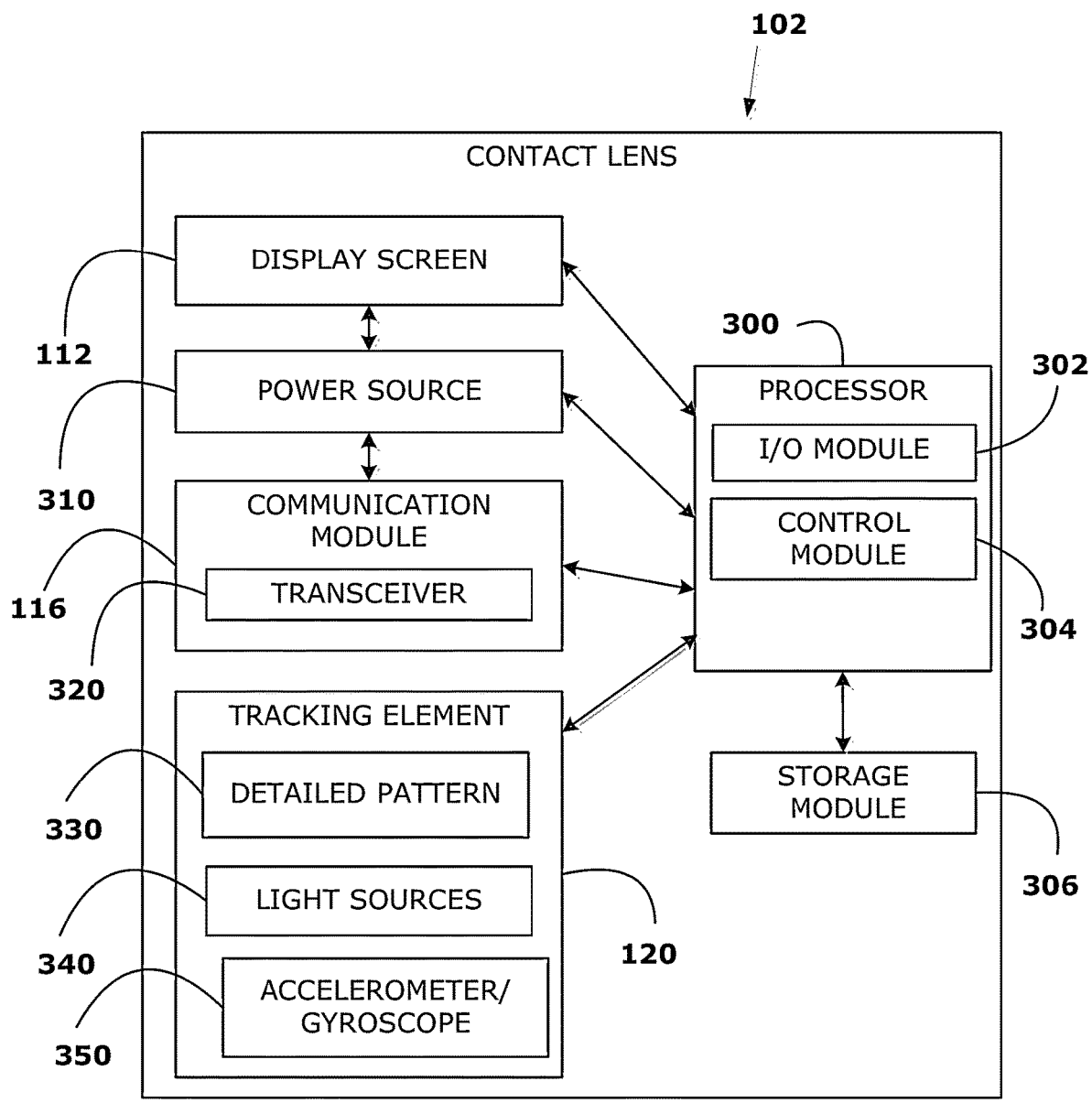
FIG. 3 is a schematic diagram showing the various components comprised within the contact lens.

FIG. 3 is a schematic diagram showing the various components comprised within the contact lens 102. In an embodiment, the contact lens 102 comprises a processor 300, a storage module 306 for storing program logic to be executed by the processor 300 for carrying out the various tasks as described herein, a display screen 112, a communication module 116, a power source 310, a transceiver 320, and a tracking element 120. As described supra, the display screen 112 and associated hardware 202 is firmly embedded in the material of the contact lens 102 and isolated from direct contact with the eye. In an embodiment, the contact lens 102 can also include a micro lens.

The processor 300 is coupled to the various electronic elements of the contact lens 102 including the display screen 112. The processor 300 enables data collection and content presentation in accordance with the various embodiments detailed herein based on the program logic retrieved from the storage module 306 and/or instructions received from external sources such as the image renderer 106. In an embodiment, the processor 300 comprises an I/O (input-output) module 302 that facilitates the processor to receive data such as rendered images or other content from external sources and to send data such as eye positions and user commands to the external sources. A control module 304 can also be included in the processor 300 that enables it to control and coordinate the various tasks executed by the different elements of the contact lens 102 in accordance with procedures detailed herein. It may be appreciated that due to the limitations of size and power consumption, the functionality of the processor 300 may need to be enhanced or aided by external entities such as the image renderer 106.

The power source 310 is configured to provide electrical energy to power the various elements of the contact lens 102. Since the minute elements included in the contact lens 102 require very little power, power can be harvested via the blinking of the eyes or from ambient sunshine in accordance with techniques known in the art. Accordingly, the power source 310 can be automatically controlled or powered on/off based on, for example, one or more of whether the contact lens 102 is in physical contact with the wearer's eye or if exposed to or hidden from the sunlight or ambient light. In an embodiment, a sensor (not shown) can be incorporated into the contact lens 102 to detect formation of a tear film when inserted into the wearer's eye in order to trigger the mechanism for activating the power source 310.

The contact lens 102 is also equipped with a communication module 116 that comprises a transceiver 320, for example, a Bluetooth transceiver, that enables information exchange with external entities, such as for example, the image renderer 106. Thus, the images rendered by the image renderer 106 are received by the processor 300 via the communication module 116. Similarly data related to the tracking of the eyes, or user input as detailed herein can be transmitted to external entities by the communication module 116. Although the communication module 116 is shown as being external to the processor 300, it may be appreciated that the communication module 116 may be included in the processor 300.

The contact lens 102 further comprises a tracking element 120 that includes various elements such as the detailed pattern 330, light sources 340 and an accelerometer/gyroscope 350. The tracking element 120 enables precise tracking of the eye position so that the images can be rendered at appropriate time and at precise positions as detailed herein. The tracking element 120 can include a detailed pattern 330 which when illuminated by the light sources 340 enables the camera 124 to precisely track the position of the eye. In an embodiment, the light sources 340 can emit light of different colors for aiding the camera 124 in better detecting the precision eye position. In addition, the tracking module 350 can also include one or more of an accelerometer or a gyroscope 350 that provides data to increase the precision of the tracking element 120, with or without the camera 124, via electronics and processing elements on the contact lens 102 itself.

Figure 4:
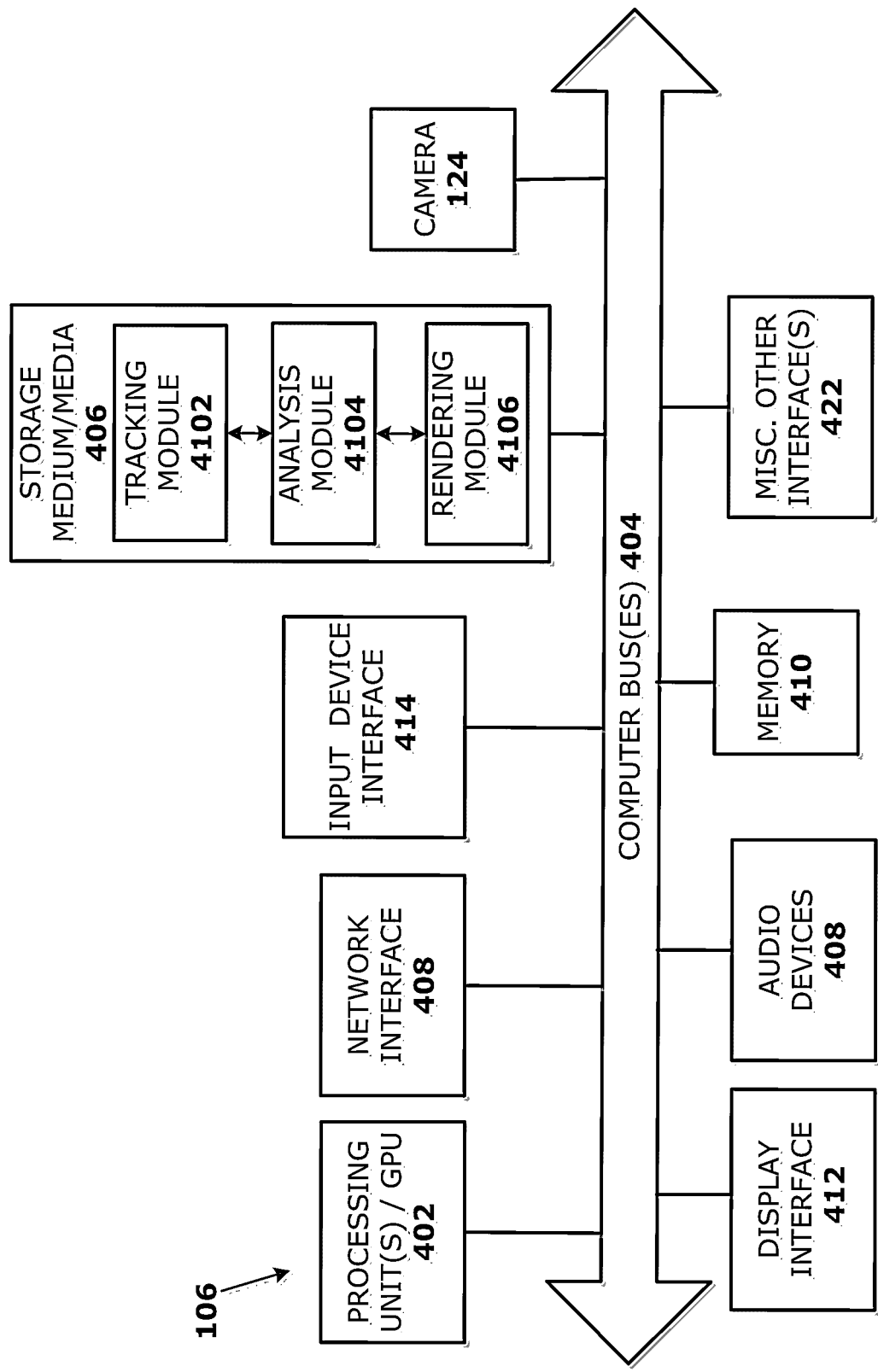
FIG. 4 shows a schematic diagram of the image renderer in accordance with one embodiment.

FIG. 4 shows a schematic diagram of the image renderer 106 in accordance with one embodiment. The image renderer 106 can comprise a general purpose computing device that includes various components of a desktop or laptop computer or a mobile computing device such as a smartphone. Accordingly, the image renderer comprises one or more processing units 402 which interface with at least one computer bus 404. In an embodiment, the processing units 402 can optionally include a graphics processor in addition to a CPU that controls the image renderer 106. Also interfacing with the bus 404 are persistent or non-transitory storage medium/media 406, network interface 408, memory 410, e.g., random access memory (RAM), run-time transient memory, read only memory (ROM), etc., a display 412 such as a monitor or other display device, input devices such as a keyboard, pointing device like a mouse, and miscellaneous other interfaces 422 not shown individually, such as media disk drive interface that can read and/or write to media including removable media such as floppy, CD-ROM, DVD, flash drives etc., parallel and serial port interfaces, a universal serial bus (USB) interface, and the like.

The network interface 408 enables the image renderer 106 to be communicatively coupled to external devices. In an embodiment, the image renderer 106 can be coupled to remote servers via LAN, WAN or the Internet in order to receive content to be rendered. The image renderer 106 is also additionally connected via wireless networks, such as a Bluetooth network, to more proximate devices such as the contact lenses 102, 104. In an embodiment, the rendered image can be transmitted to the contact lenses 102, 104 for display to the user. Similarly, the eye tracking data and user commands or input can be received from the contact lenses 102, 104 via the wireless networks by the network interface 408.

Memory 410 interfaces with the computer bus 404 so as to provide information stored therein to the CPU 402 during execution of software programs such as the operating system, application programs, device drivers, and software modules that comprise program code or logic, and/or computer-executable process steps, incorporating functionality described herein, e.g., one or more of process flows described herein. CPU 402 first loads computer-executable process steps or logic or modules from storage, e.g., memory 404, storage medium/media 406, removable media drive, and/or other storage device. CPU 402 can then execute the stored process steps in order to execute the loaded computer-executable process steps. Stored data, e.g., data stored by a storage device, can be accessed by CPU 402 during the execution of computer-executable process steps.

Persistent storage medium/media 406 is a computer readable storage medium(s) that can be used to store software and data, e.g., an operating system and one or more application programs. Persistent storage medium/media 406 can also be used to store device drivers, such as one or more of a digital camera driver, monitor driver, printer driver, scanner driver, or other device drivers, web pages, content files, metadata, playlists and other files. Persistent storage medium/media 406 can further include program modules/program logic in accordance with embodiments described herein and data files used to implement one or more embodiments of the present disclosure.

In an embodiment, the program modules comprise a tracking module 4102 that comprises processor executable instructions for receiving image data of the wearer's eyes from the camera 124 and for determining a linear and angular position for each of the user's eyes from the camera data. In an embodiment, based on changes in the eye positions detected in a continuous stream of data received from the camera 124, the tracking module 4102 can be configured to determine an amplitude and direction of motion of the wearer's eyes. The data thus derived by the tracking module 4102 can be transmitted to the analysis module 4104 for determining a likely final resting position of the wearer's eyes in accordance with embodiments detailed infra.

Similar to the tracking module 4102, the analysis module 4104 comprises processor executable steps for estimating the final position at which the wearer's eyes or the cornea of the wearer's eyes are likely to come to rest. In an embodiment, the analysis module 4104 can also receive the wearer's thought input from the thought detector 126. Based on one or more of the data received from the tracking module 4102 and the wearer's thought input received from the thought detector, the analysis module 4104 estimates the likely final position for the wearer's eyes. In an embodiment, the data regarding the likely final position can be communicated via the rendering module 4106 that comprises processor-executable logic or instructions to enable the processing units 402 to render a viewpoint in a 3D virtual space at the likely final position. This is useful when executing processing-intensive applications such as video games as it mitigates the need to render an entire scene continuously throughout the path of motion of the user's eyes. As the rendering is transmitted directly into the wearer's eyes, persistence of vision causes the wearer to perceive a continuously rendered scene rather than viewpoints rendered at discrete positions.

Figure 5A:
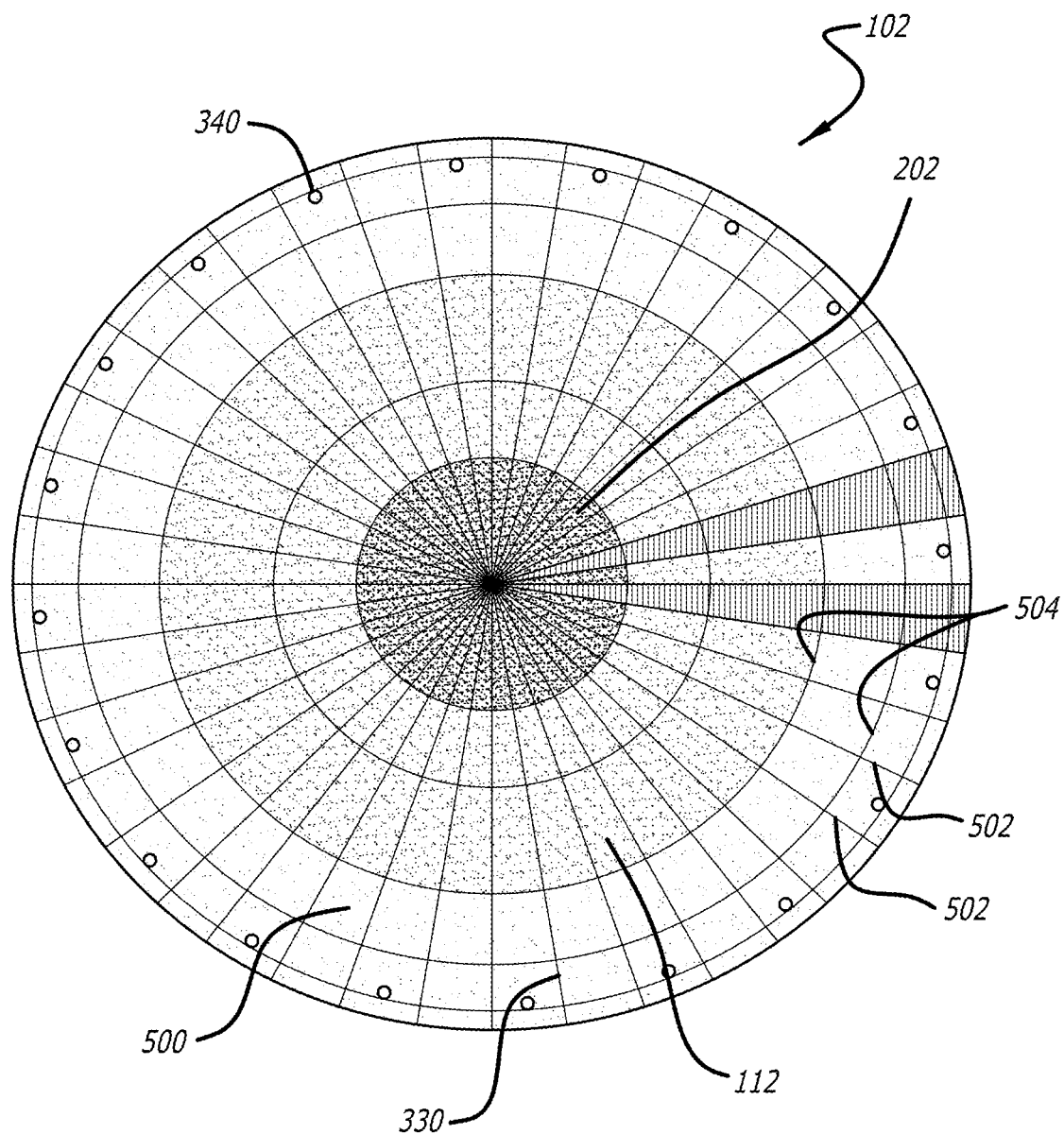
FIG. 5A is a schematic illustration showing the outer surface of the contact lens.

FIG. 5A is a schematic illustration showing the outer surface 500 of the contact lens. In one embodiment instructions for receiving input from the visual cortex further comprise instructions that cause the processor to receive electrical signals sensed from the user's visual cortex and identify a command from the received electrical signals. In one embodiment, instructions for altering the rendered initial image based on the input further comprise instructions that cause the processor to alter the rendered initial image based on the command. The contact lens 102 includes a display screen 112 for displaying content to the wearer and a plurality of light sources 340. They serve to illuminate not only the eye of the wearer but also the pattern 330 included in the contact lens 102. This enables tracking the position and motion of the user's eye by the camera 124 of the image renderer 106. As seen from FIG. 5, the pattern 330 comprises a plurality of markings 502, 504 or grooves 502, 504 in the material of the contact lens 102. A first subset of markings, such as markings 502, extends from a first edge of the contact lens to a second edge of the contact lens. A second subset of markings, such as markings 504, that are normal to the first set of markings and extend along the curvature of the contact lens. In an embodiment, one or more of the grooves 502, 504 include a conducting material to distribute power to elements spread around the contact lens 102. In an embodiment, the plurality of markings 502 may not be visible to the naked eye under normal light. However, the markings 502, 504 can be visible when illuminated with the light from the light sources 340. Hence a precise determination of the linear and angular position of the user's eyes is facilitated. In addition, the hardware required for the functioning of the contact lens 102 is located at the central portion of the lens 102 and behind the screen 112. The hardware 202 includes elements such as but not limited to a processor 300, a storage module 306 for storing program logic to be executed by the processor 300, a power source 310, a communication module 116 including a transceiver 320.

Figure 5B:
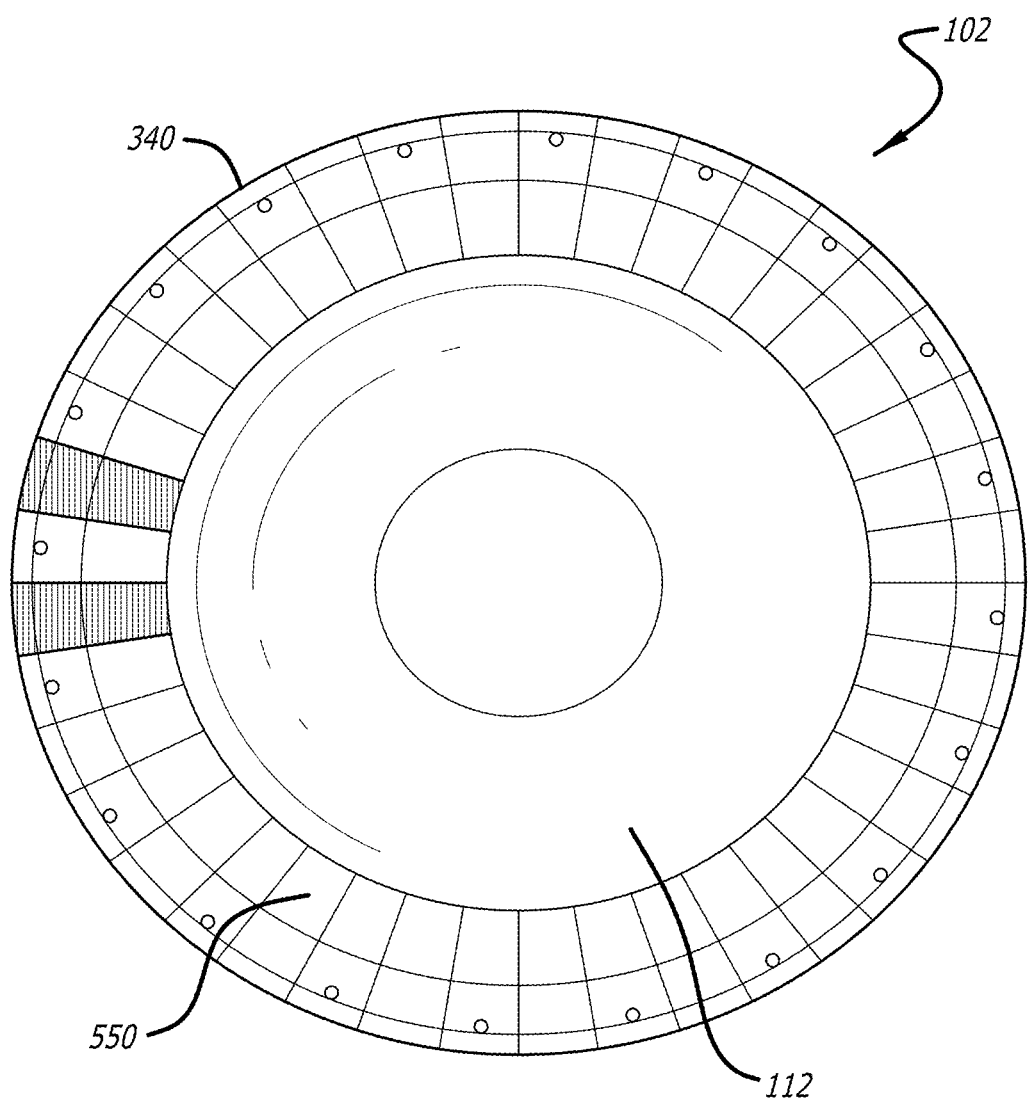
FIG. 5B is a schematic illustration showing the inner surface of the contact lens in accordance with an embodiment.

FIG. 5B is a schematic illustration showing the inner surface 550 of the contact lens 102 in accordance with an embodiment. As seen from FIG. 5B, the display screen 112 is included at the central portion of the contact lens 102 and the plurality of light sources 340 are arranged around the display screen 112 on the periphery of the contact lens 102. In an embodiment, the plurality of light sources 340 are equidistant from each other.

Figure 6:
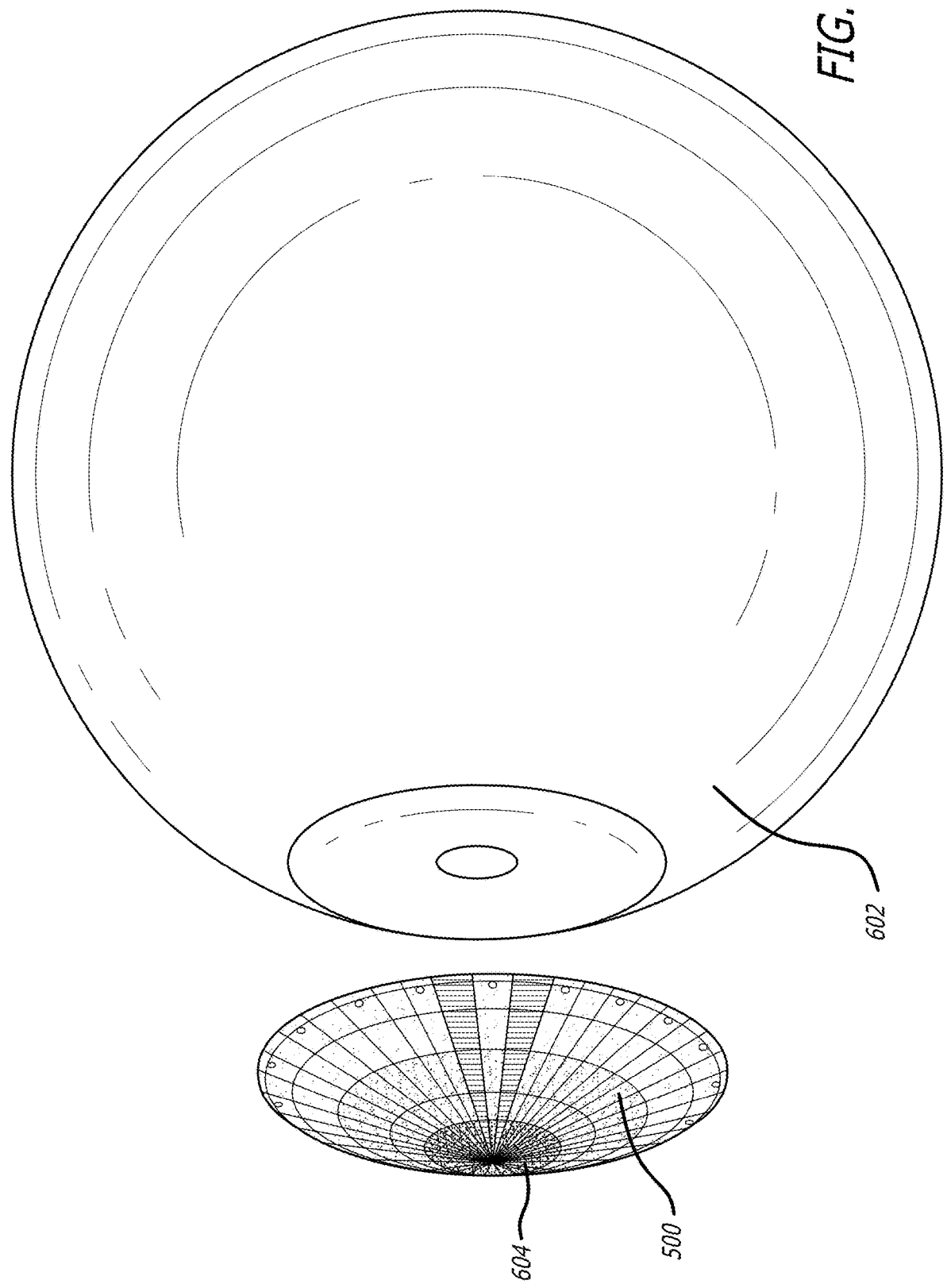
FIG. 6 is a schematic illustration showing the arrangement of the contact lens in a wearer's eye.

FIG. 6 is a schematic illustration showing the arrangement of the contact lens 102 in a wearer's eye 602. When inserted into the eye 602, the inner surface 550 (not seen in FIG. 6) of the contact lens 102 will be in physical contact with the user's eye 602. The outer surface 500 will face away from the wearer's eye. In this arrangement, the hardware 202 will also not be in contact will the wearer's eye. In an embodiment, the hardware 202 is arranged on the contact lens 102 as a bell curve so that a large part of the hardware is accommodated in the bulge 604 of the contact lens 102 thereby mitigating any discomfort to the wearer.

Figure 7:
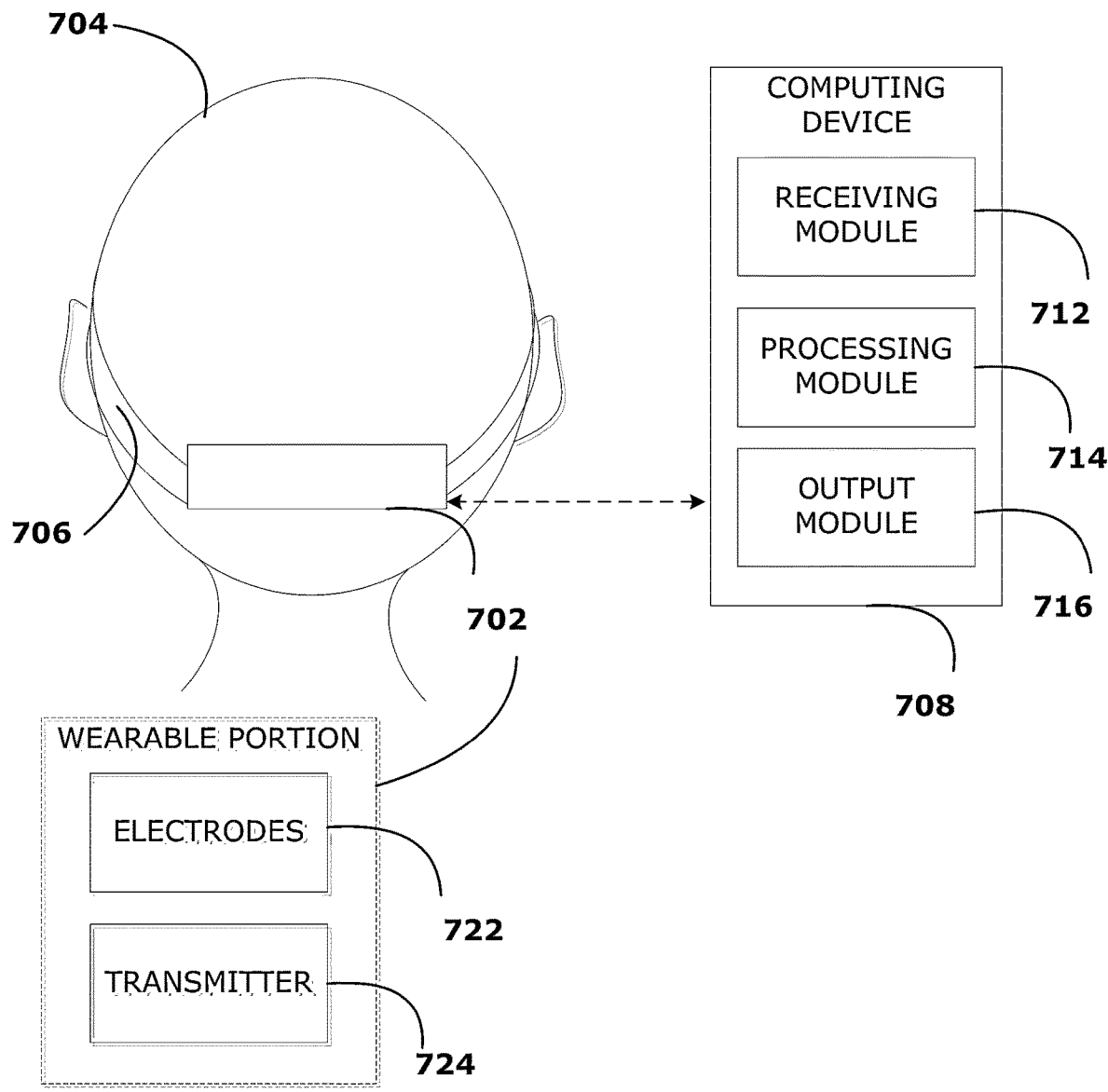
FIG. 7 is a schematic illustration of a thought recorder in accordance with one embodiment.

FIG. 7 is a schematic illustration 700 of the thought recorder 126 in accordance with one embodiment. The wearable portion 702 of the thought recorder 126 is attached to a user's 704 head via an attaching means such as a band 706. The wearable portion 702 is attached so that it is in physical contact with the user's 704 visual cortex located on the lower, rear side of the user's 704 brain. A plurality of electrodes or sensors 722 are included in the wearable portion 702 for sensing electrical signals generated in the user's 704 visual cortex. Although the wearable portion 702 is shown as one component in contact with a single portion of the user's 704 brain, it may be appreciated that this is not necessary. The wearable portion 702 can be configured as a headset which includes a plurality of sensors or electrodes that can be in contact with different points of the user's 704 brain to collect thought information.

In an embodiment, technologies available for EEG (electroencelphalogram) can be employed within the thought detector 126. Brain cells talk to each other by exchanging tiny electrical signals and an EEG is a non-invasive procedure employed in the medical field for recording such electrical activity. A number of electrodes are placed at different points on the scalp of a person to detect voltage fluctuations caused by ionic flow of current between the brain cells. Experiments have found that when people visually imagine something their eyes move in a manner that they would move if they were actually looking at the object of their imagination. For example, if a person imagines a skyscraper, the person's eyes move in a top-down manner. Similarly if the person imagines a train, the person's eyes would move side to side. The occipital cortex (also called the visual cortex), at the back of the head is one of the first areas of the human brain where information coming in from the user's 704 eyes arrives and where a lot of work of understanding what the user 704 is seeing goes on. Experiments related to the brain activity also reveal that the visual cortex of the brain is particularly active when people imagine or look at an object in their mind's eye. The wearable portion 702 of the thought detector 126 is therefore placed at the rear of the user's 704 head near the visual cortex. However, the wearable portion 702 can have additional electrodes located relative to other parts of the brain to collect information from such parts to detect the user's 704 imagined thoughts and/or images and employ it in manipulating the display of the contact lenses 102, 104.

The wearable portion 702 of the thought detector is communicatively coupled to a computing device 708 via a wired or wireless connection using the transmitter 724. In an embodiment, the image renderer 106 can execute tasks of the computing device 708 to process data signals from the wearable portion 702. The data collected by the wearable portion 702 is obtained by the receiving module 712. The received data is processed by the processing module 714. In an embodiment, the received data can indicate a particular input the user's 704 desire to provide to the image system 100. For example, the user 704 can provide signals to the wearable portion 702 that may include but not limited to inputting data or selecting commands to manipulate content such as manipulating a game avatar, normal user interface functions such as cut-copy-paste and the like. The output module 716 can provide information regarding the user's 704 desired output to the image renderer 106 for execution of the corresponding command.

Figure 8:
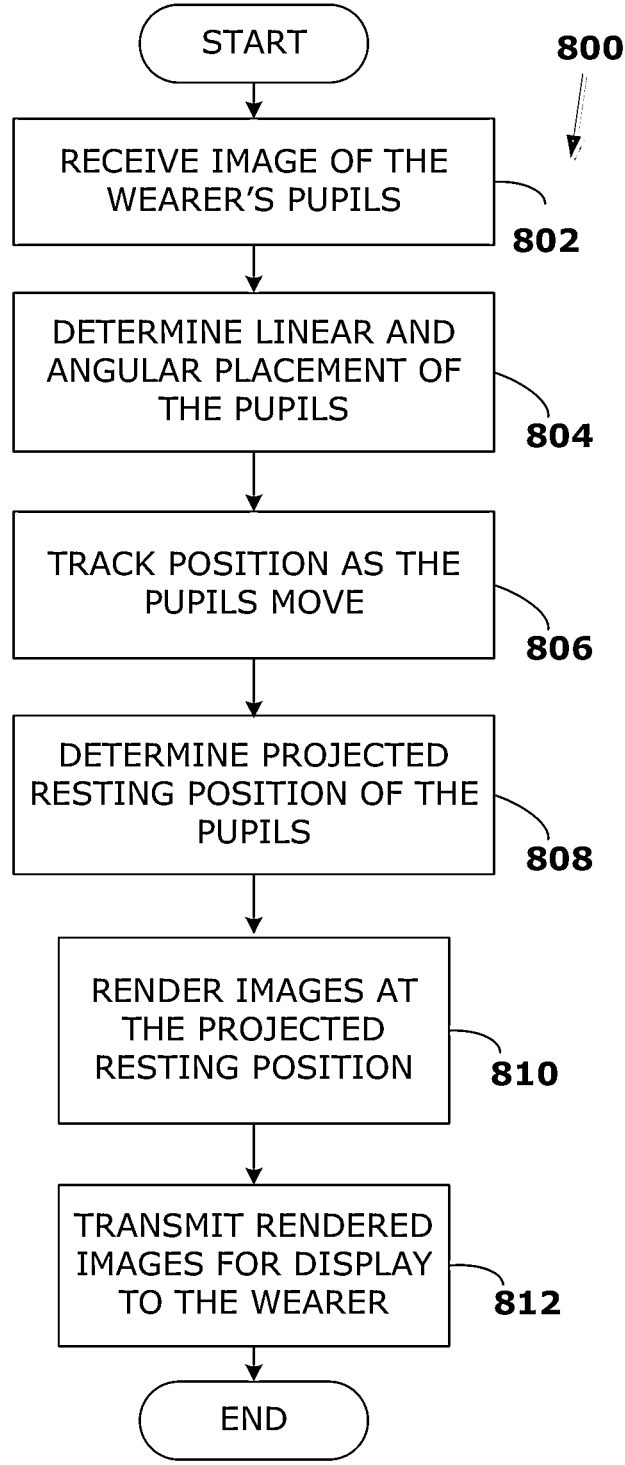
FIG. 8 is a flow chart that details a method of providing content in accordance with one embodiment.

FIG. 8 is a flow chart 800 that details a method of providing content in accordance with one embodiment. The method begins at 802 wherein the camera 124 receives the image of the wearer's pupils. The light sources 340 located on the contact lenses 102, 104 serve to illuminate the pupils and aid the camera 124 to receive the image of the pupils. At 804, the linear and angular position of the wearer's pupils is determined based on the detailed pattern 330. As the pupils move, their position is tracked by the motion of the detailed pattern 330 in the three dimensional space as shown at 806. This aids the image renderer 106 in obtaining the amplitude and direction of the pupils' motion. Based on the amplitude and direction of the pupils' motion, a likely final resting position of the pupils can be projected by the image renderer 106 at 808. In an embodiment, the image renderer 106 can additionally receive input from the thought detector 126 that can be factored into estimating the likely final resting position of the wearer's eyes. In an embodiment, training data can be fed to the image renderer 106 that can enhance the precision of estimating the likely final resting position of the wearer's eyes. In an embodiment, the content provided can include interactive content such as, games, or other software wherein the wearer can move objects in the virtual space. Accordingly, at 810 the images are rendered at the likely final position of the wearer's eyes. This aspect greatly reduces the processing burden on the image renderer 106 as the images need not be rendered continuously along the entire path of the wearer's gaze. Rather, only the images at the final resting position need to be rendered. As a result even devices with lower processing capabilities and which have no specialized hardware to render graphics can also be used for rendering images in accordance with this embodiment. At 812, the rendered images are transmitted to the contact lenses 102 and 104 for display to the wearer. It may be appreciated that more than one rendering can be generated in accordance with this procedure so that a unique rendering can be transmitted at 812 to each of the contact lens 102 and 104 so that two portions of a contiguous display are generated on respective display screens 112, 114.

Figure 9:
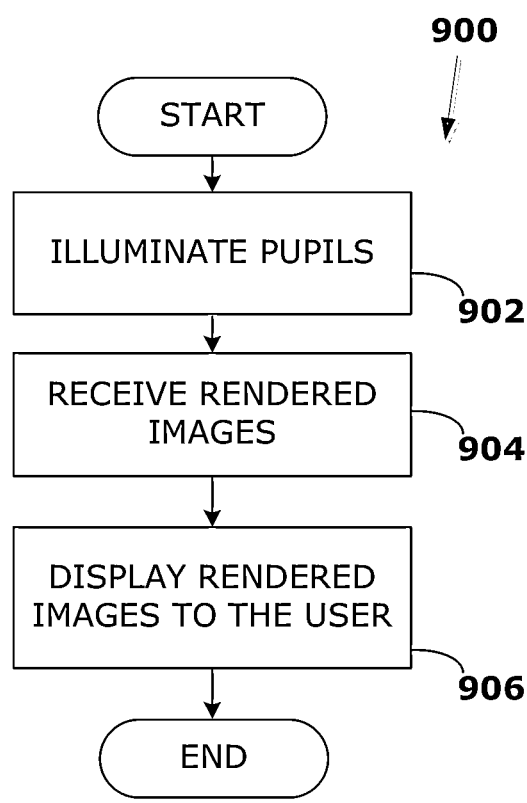
FIG. 9 illustrates a flow chart that details a method of providing content to a user of the image system in accordance with one embodiment.

FIG. 9 illustrates a flow chart 900 that details a method of providing content to a user of the image system 100 in accordance with one embodiment. The method begins with illuminating the user's eyes by the light sources 340 on the contact lenses 102, 104 as shown at 902. At 904, rendered images are received by the contact lenses 102 and 104 from the image renderer 106. The received images are displayed to the wearer on respective display screens 112 and 114 at 906.

Figure 10:
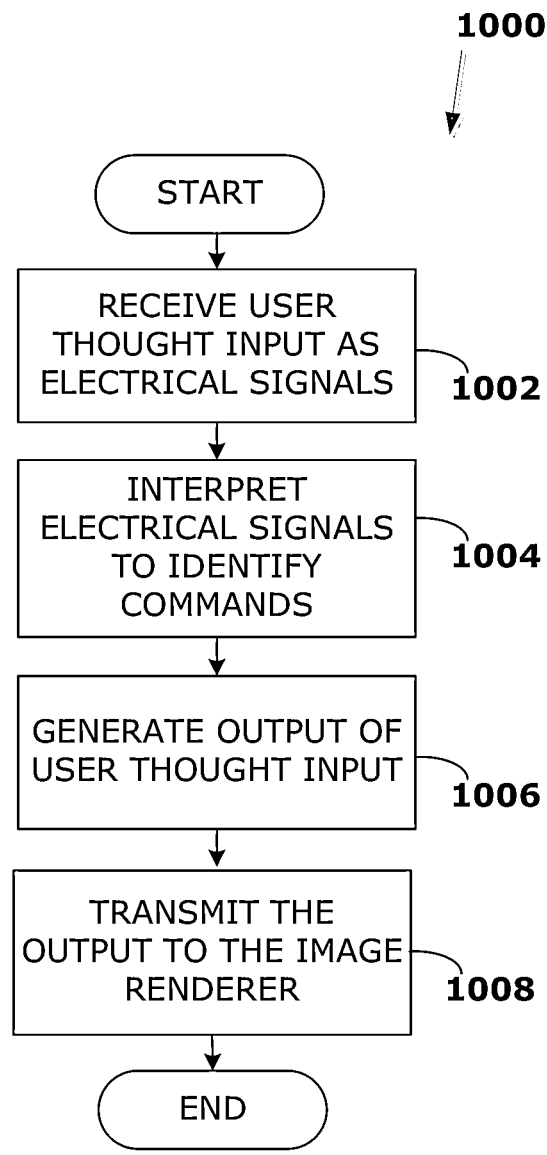
FIG. 10 is a flowchart that details a method of providing user input to the image renderer in accordance with one embodiment.

FIG. 10 is a flowchart 1000 that details a method of providing user input to the image renderer 106 in accordance with one embodiment. The method begins at 1002 by sensing electrical signals caused by thoughts generated in the user's 704 brain. The electrical signals are interpreted at 1004 in order to decipher or identify a command from the user's 704 thought input. In an embodiment, the processing module 714 of the thought detector 126 can be configured to interpret particular electrical signals received from the user's 704 brain as user input of specific commands for the image renderer 106. In an embodiment, the user 704 can be trained regarding particular thoughts that he or she needs to generate in order to be accurately interpreted by the thought detector 126. The output of the user thought input is generated at 1006. In an embodiment, feedback can be provided to the user 704 if the thought recorder 126 is unable to accurately interpret the thought input. The output generated at 1006 is transmitted for execution to the image renderer 106 at 1008.

It may be appreciated that although embodiments disclosed herein are discussed in detail with respect to receiving user input via tracking the user's eyes or receiving the use's thought input, the image system 100 can also receive input via conventional means such as, keyboard, pointing devices, joysticks, scanners and the like. In such embodiments, the input can be received by one or more of the image renderer 106/computing device 708. The received user input can be conveyed to the contact lenses 102/104 in accordance with embodiments detailed herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A contact lens comprising:
   a power source positioned on the lens;
   a wireless communication module positioned on the lens and powered by the power source and in communication with a remote image renderer not positioned on the lens;
   a display screen on a lens surface for displaying images and in communication with the wireless communication module and the power source, the display screen receiving images from the remote image renderer via the wireless communication module; and
   a tracking element positioned on the same lens surface, wherein the tracking element comprises a detailed pattern formed by a plurality of grooves formed in the material of the contact lens, the detailed pattern being formed by at least two subsets of the plurality of grooves spreading over the surface of the contact lens in two respective directions, at least some of the plurality of grooves being filled with conducting materials transmitting power from the power source to one or more light sources arranged on a periphery of the same lens surface, the one or more light sources illuminating the detailed pattern for detection by the remote image renderer.

2. The contact lens of claim 1, the at least two subsets of the plurality of grooves comprises a first subset of grooves that extend from a first edge of the contact lens to a second edge of the contact lens and a second subset of grooves that are normal to the first subset of grooves.

3. The contact lens of claim 1, wherein the plurality of grooves are grooves made in a material of the contact lens.

4. The contact lens of claim 1, wherein the display screen is located at a central portion of the contact lens.

5. The contact lens of claim 1, wherein the power source and the wireless communication module is located behind the display screen.

6. The contact lens of claim 1, wherein the display screen comprises an OLED display.

7. The contact lens of claim 1, further comprising an accelerometer.

8. The contact lens of claim 1, wherein the wireless communication module comprises a Bluetooth transceiver.

9. An image system comprising:
   at least one powered contact lens that comprises at least a display screen on a lens surface for displaying images and in communication with a wireless communication module and a power source, the display screen receiving images from a remote image renderer via the wireless communication module, the power source positioned on the lens and a tracking element positioned on the same lens surface, wherein the tracking element comprises a detailed pattern formed by a plurality of grooves formed in the material of the contact lens, the detailed pattern being formed by at least two subsets of the plurality of grooves spreading over the surface of the contact lens in two respective directions, at least some of the plurality of grooves being filled with conducting materials transmitting power from the power source to one or more light sources arranged on a periphery of the same lens surface, the one or more light sources illuminating the detailed pattern for detection by a remote image renderer,
   the remote image renderer communicatively coupled to the at least one powered contact lens and transmitting rendered images to the display screen of the powered contact lens for display.

10. The image system of claim 9, the at least one powered contact lens comprises two powered contact lenses.

11. The image system of claim 10, wherein the image renderer comprises a camera for tracking a linear and angular position of the eyes of a user wearing the powered contact lenses.

12. The image system of claim 10, the image renderer comprises a communication interface for transmitting rendered images to and for receiving tracking data from each of the two powered contact lenses.

13. The image system of claim 10, wherein the image renderer comprises:
    tracking logic, executed by a processor comprised within the image renderer, for determining changes in linear and angular positions of a user's eyes that wear the two powered contact lenses.

14. The image system of claim 13, wherein the image renderer comprises:
    analyzing logic, executed by the processor comprised within the image renderer, for estimating the final position at which the wearer's eyes are likely to come to rest.

15. The image system of claim 14, wherein the image renderer comprises:
    a rendering module, executed by a processor comprised within the image renderer, for rendering a viewpoint in a 3D virtual space at the likely final position.

16. The image system of claim 13, further comprising a thought detector for detecting electrical signals from the wearer's brain.

17. The image system of claim 16, wherein the thought detector comprises a wearable portion configured to be attached to a wearer's head.

18. The image system of claim 17, the wearable portion comprises electrodes configured to detect electrical signals from the wearer's visual cortex.

19. A method of providing content comprising:
    rendering, by a processor, an initial image;
    transmitting, by the processor, the rendered initial image rendered by an image renderer to at least one powered contact lens positioned on a user's eye such that the rendered initial image is displayed on a display screen comprised in the powered contact lens;
    tracking, by the processor, motion of the user's eye wearing the powered contact lens via a tracking element positioned on a lens surface comprising a detailed pattern formed by a plurality of grooves formed in the material of the contact lens, the detailed pattern being formed by at least two subsets of the plurality of grooves spreading over the surface of the contact lens in two respective directions, at least some of the plurality of grooves being filled with conducting materials transmitting power from a power source to one or more light sources arranged on a periphery of the same lens surface and the one or more light sources illuminating the detailed pattern;
    estimating, by the processor, a final position at which the user's eye wearing the contact lens is likely to rest in advance of the user's eye reaching the final position based at least on the tracking of a current motion of the user's eye wearing the contact lens;

rendering, by the processor, a second image that shows a viewpoint associated with the final position; and transmitting, by the processor, the second image to the powered contact lens for display to the user.

20. The method of claim 19, wherein tracking the motion of the user's eye further comprises:

receiving, by the processor, a continuous image stream of the user's eye;

mapping, by the processor, the position of the user's eye in the image stream relative to the 3-dimensional space based on positions of the plurality of grooves included on the powered contact lens in the image stream.

21. The method of claim 20, wherein tracking the motion of the user's eye further comprises: determining, by the processor, changes in linear and angular positions of the user's eye via the mapping.

22. The method of claim 19, wherein estimating the final position further comprises: determining, by the processor, an amplitude and direction of the motion of the user's eye.

23. The method of claim 19, further comprising: receiving, by the processor, input from the user's visual cortex.

24. The method of claim 23, wherein estimating the final position further comprises: estimating, by the processor, the final position based additionally on the input received from the user's visual cortex.

25. The method of claim 19, wherein the at least one powered contact lens comprises two powered contact lenses.

26. A non-transitory computer readable medium comprising instructions that cause a processor to:

render an initial image;

transmit the rendered initial image rendered by an image renderer to at least one powered contact lens positioned on a user's eye such that the rendered initial image is displayed on a display screen comprised in the powered contact lens;

track motion of the user's eye wearing the powered contact lens via a tracking element positioned on a lens surface comprising a detailed pattern formed by a plurality of grooves formed in the material of the contact lens, the detailed pattern being formed by at least two subsets of the plurality of grooves spreading over the surface of the contact lens in two respective directions, at least some of the plurality of grooves being filled with conducting materials transmitting power from a power source to one or more light sources arranged on a periphery of the same lens surface and the one or more light sources illuminating the detailed pattern;

estimate a final position at which each of the user's eye wearing the contact lens is likely to rest in advance of each of the user's eye reaching the final position based at least on the tracking of the contact lens;

render a second image that shows a viewpoint associated with the final position; and transmit the second image to the powered contact lens for display to the user.

27. The computer readable medium of claim 26, wherein instructions for tracking the motion of the user's eye further comprise instructions that cause the processor to:

receive a continuous image stream of the users eye;

map positions of the user's eye in the image stream based on positions of the plurality of grooves included on the powered contact lens in the image stream.

28. The computer readable medium of claim 27, wherein instructions for tracking the motion of the user's eye further comprise instructions that cause the processor to: determine changes in linear and angular positions of the user's eye via the mapping.

29. The computer readable medium of claim 26, wherein instructions for estimating the final position further comprise instructions that cause the processor to: determine an amplitude and direction of the motion of the user's eye.

30. The computer readable medium of claim 26, further comprising instructions that cause the processor to: receive input from the user's visual cortex.

31. The computer readable medium of claim 30, wherein instructions for estimating the final position further comprising instructions that cause the processor to: estimate the final position based additionally on the input received from the user's visual cortex.

* * * * *